March 8, 1966 P. JEAN-MARIE THEODORE ALLARD 3,239,087

HYDRO-ELECTRIC CONTROL SYSTEM

Filed Feb. 26, 1963 6 Sheets-Sheet 1

Inventor:

Pierre Jean-Marie
Theodore Allard
E. M. Squire
By His Attorney

Inventor:
Pierre Jean-Marie
Theodore Allard
By E. M. Squire
His Attorney

March 8, 1966 P. JEAN-MARIE THEODORE ALLARD 3,239,087
HYDRO-ELECTRIC CONTROL SYSTEM
Filed Feb. 26, 1963 6 Sheets-Sheet 5

Inventor:
Pierre Jean-Marie
Theodore Allard
E. M. Squire
By His Attorney

March 8, 1966 P. JEAN-MARIE THEODORE ALLARD 3,239,087
HYDRO-ELECTRIC CONTROL SYSTEM
Filed Feb. 26, 1963 6 Sheets-Sheet 6

Inventor:
Pierre Jean-Marie
Theodore Allard
By E. M. Squire
His Attorney

United States Patent Office 3,239,087
Patented Mar. 8, 1966

3,239,087
HYDRO-ELECTRIC CONTROL SYSTEM
Pierre Jean-Marie Theodore Allard, Paris, France, assignor to Societe Francaise de Construction de Bennes Automatiques Benoto, Paris, France, a corporation of France
Filed Feb. 26, 1963, Ser. No. 261,186
Claims priority, application France, Oct. 25, 1962, 913,339, Patent 1,347,075
3 Claims. (Cl. 214—656)

My invention has for its object a hydroelectric control system intended chiefly but not exclusively for the equipment of hoisting and handling apparatus such as skips, elevators, conveyors, mine-shovelling machines and the like.

In most of the hoisting and handling apparatus used hitherto, the different operations are controlled hydraulically under the control of a supply of energy constituted by an electric motor, the possibility of speed reversal of which serves for changing the direction of operation of the different jacks or receiving means inserted in the hydraulic circuits, which leads to the use of motors producing a high torque, since such motors are to start generally under load. These motors are generally heavy and bulky and require a considerable consumption of energy. Furthermore, such an arrangement has for its drawback to produce a speedy wear of the parts, groups of parts or elements which are driven directly by the driving shaft, their components being subjected to shearing stresses produced by the shocks due to reversals of the direction of rotation.

My invention has for its object to remove these drawbacks, by providing a hydroelectric arrangement which is highly adaptable and includes an electric motor operating continuously for setting under pressure the fluid, while electric circuits control the different movements, to wit: starting, stopping and reversal of the different operations, without any stopping or change in direction of said motor, whereby a possibility afforded of using a motor starting directly with an operative torque equal to at least three times its nominal power, while its bulk and weight are reduced and its cost price is lower under equal power conditions, said motor having furthermore an excellent cos $\varphi$.

The feeding of the apparatus and of the different machines is generally ensured either by bare cables through the agency of frictional members for certain apparatus, or, more generally, by yielding feeding cables. The use of a continuously operating motor has for its advantage that it allows the feeding of said motor through a three-lead cable, since there is no reversal to be executed and the different control operations providing for starting, stopping and reversal are executed through pilot wires of a reduced cross-section, which allows resorting to a general feed cable of a small size which is consequently less heavy and winds more readily.

According to a main feature of my invention, the motor operating continuously in a predetermined direction, carries at the end of its shaft power-tapping means of a known type adapted to drive a hydraulic group operating under a high pressure, so as to suck fluid out of a container and to deliver it into a distributing unit, constituted by elementary distributors, the number of which varies according to the intricacy of the controlled structure, said elementary distributors feeding, in the case of a skip, a number of jacks providing for the opening or closing of the skip shells, and also the rocking of said skip around the swing bars to which it is suspended.

According to a second feature of my invention, the means for starting, stopping and reversing operate through the agency of hydroelectric valves controlling a low pressure circuit acting on either the upper or the lower surface of the slide valve housed inside the body of the control distributor. According to the position occupied by said slide valve, the high pressure fluid is fed towards one of the different pipes which provide for the desired movement. The number of circuits and the type of apparatus controlled hydraulically may vary and a single main control group may control, for instance, a number of jacks or of hydraulic power units inserted in parallel in the main hydraulically fed circuit.

According to a still further object of my invention, the motor and the electrically controlled valves being fed through a yielding cable, the means winding the cable are carried by the moving apparatus, whether a crane or a skip and are controlled hydraulically through the same motor or power unit as that which serves for controlling the actual apparatus.

According to my invention, the hydraulic control of the winding means is performed through the agency of a low pressure hydraulic circuit inserted in parallel with the main circuit and controlled by the same power unit which actuates the winding drum through the agency of a hydraulic power unit; the latter exerts a continuous tractional stress sufficient for the winding of the cable when the apparatus considered moves towards the point to which said feeding cable is secured, which continuous tractional stress is adjusted so as to allow a proper winding of the cable without however preventing the unwinding of the latter when the apparatus moves away from the point to which the cable is secured, the hydraulic power unit controlling the winding drum operating then after the manner of a pump and delivering the fluid into the container.

Various other features of my invention will appear in the reading of the following description of one or more embodiments of my inveniton.

The accompanying drawings, given by way of example and by no means in a limiting sense, illustrate a preferred embodiment of an arrangement according to my invention, operating a skip provided with an electric motor controlled hydraulically. In said drawings.

Figure 1:
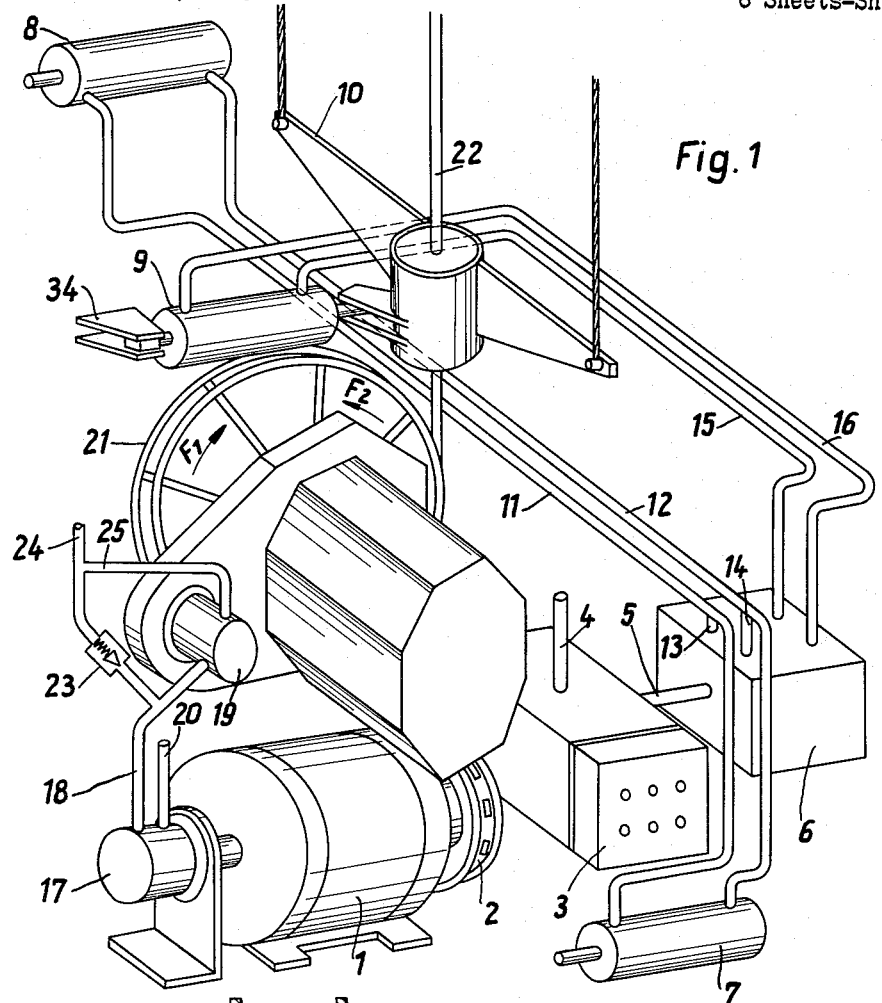
FIG. 1 illustrates diagrammatically a hydro-electric control system according to my invention.

As illustrated in FIG. 1, a continuously operating motor 1 the characteristic features of which are such that it can absorb overloads up to three times its normal power, is started by a suitable "ON" and "OFF" control (not shown). It is connected through a coupling 2 with a hydraulic pump 3 operating under high pressure. The pump 3 is connected, on the one hand, with a supply reservoir 33 (FIG. 2) through a pipe 4 and pumps, on the other hand, high pressure fluid into a pipe 5 opening into a distributing unit 6 which comprises the electrically controlled valves for starting, stopping and reversing operations. As shown in FIG. 1, one electrically controlled valve controls the jacks 7 and 8 which provide for the closing and opening of the skip shells (FIG. 5), while a further electrically controlled valve controls the jack 9 which causes rotation of the skip with respect to the bar 10 from which the skip is suspended.

The jacks 7 and 8 are interconnected through the pipes 11 and 12, said pipes 11 and 12 being connected in their turn with the corresponding electrically controlled valve through the agency of pipes 13 and 14, the jack 9 being connected with the electrically controlled valve corresponding thereto through the agency of pipes 15 and 16.

The motor 1 also drives a low pressure pump 17. Pump 17 is connected through a pipe 18, to a hydraulic take-up motor 19, the pump 17 being connected with the above-mentioned supply reservoir through a pipe 20. The low pressure pump 17 is continuously driven in the same direction and it feeds the hydraulic take-up motor 19 directly through the pipe 18 so that motor 19 continuously urges the take-up drum 21 to reel in the flexible electrical cable 22 by turning in the direction of the arrow F1. The motor 19 drives the take-up drum 21 through an enclosed belt or chain drive the details of which are not visible in the drawing.

When the cable 22 is tensioned and the drum 22 is thereby held stopped, the fluid under pressure delivered by the pump 17 is by-passed, through a pressure regulating valve 23 and returns to the supply reservoir through a pipe 24.

When the drum 21 is pulled by the cable 22 to pay out cable 22 by turning in the direction of the arrow F2, the take-up motor 19 operates as a pump drawing fluid through the pipe 25 and pumping it into the constant pressure pipe 18, but since the pump 17 also delivers it into the same pipe 18, the regulating valve 23 by-passes the fluid through return pipe 24 to the supply reservoir.

Figure 3:
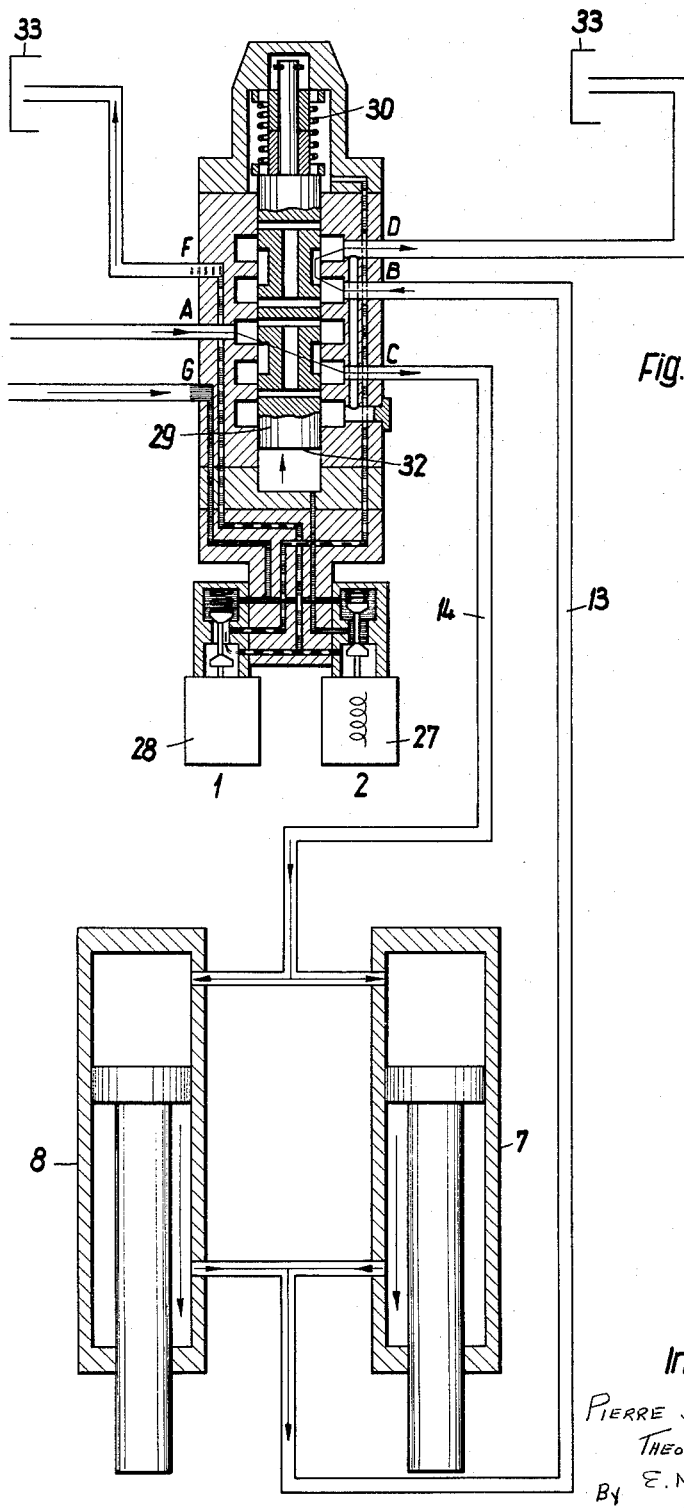
FIG. 3 is an elevational, sectional view of the distributor of FIG. 2 during the closing of the skip shells under the action of its jacks.
Figure 4:
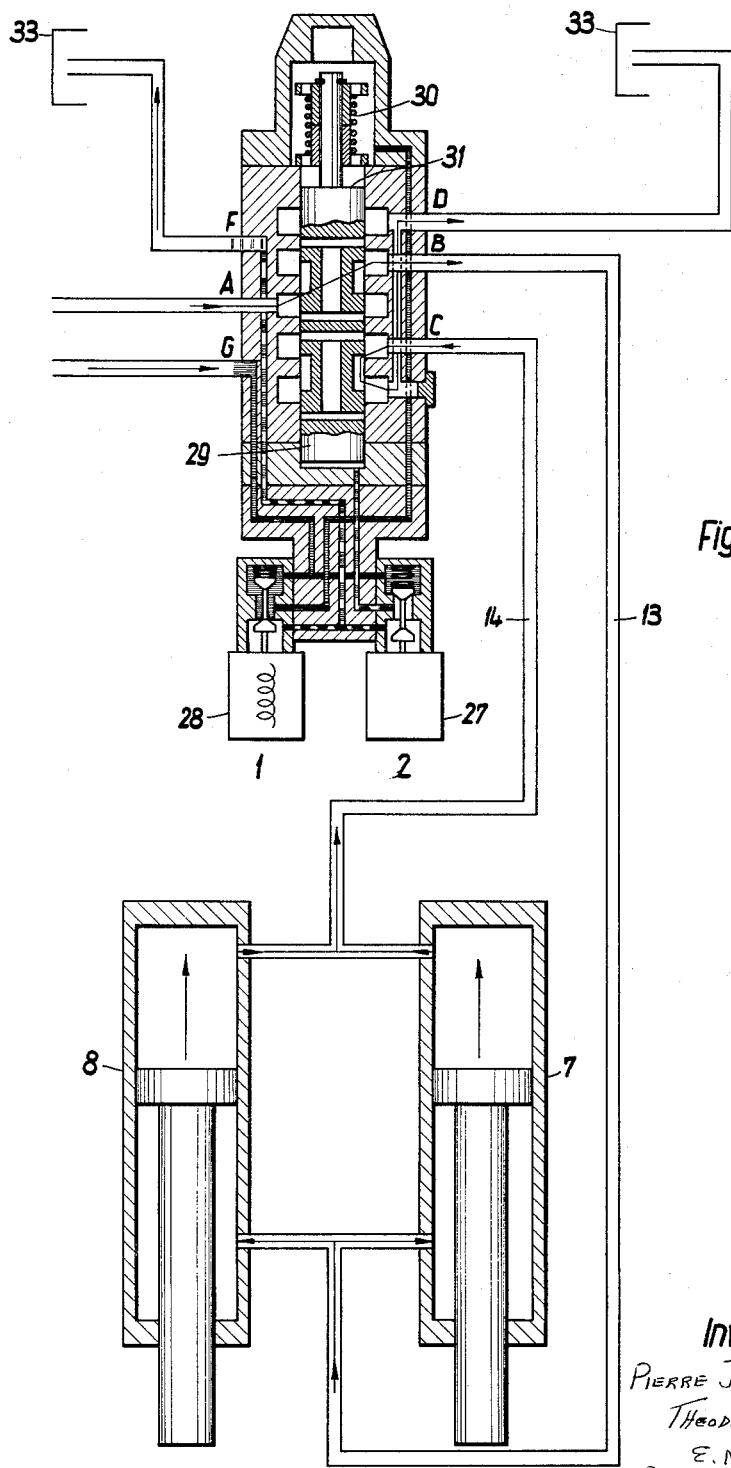
FIG. 4 shows the same arrangement as FIGS. 2 and 3 during the opening of said shells.

The operation of the electrically controlled valves controlling the skip-closing jacks 7 and 8 as well as the skip-turning jack 9 according to FIGS. 2 to 4, will now be described.

For a better understanding of the operation, I will refer more particularly to the arrangement controlling the jacks 7 and 8, that is the skip-opening and closing jacks, the operation being the same for the jack 9 which is also fed by a similar electrically controlled valve.

The electrically controlled valve 26 (FIGS. 2 to 4) is incorporated with the distributing unit 6, the fluid under high pressure from pump 3 entering the distributor or electrically controlled valve through a central port A, while low pressure fluid from pump 17 enters through the port G so as to control the main slide valve 29 which is connected with the high pressure circuit, the admission of the low pressure fluid being operated by the electrically controlled valves 27 and 28.

Figure 2:
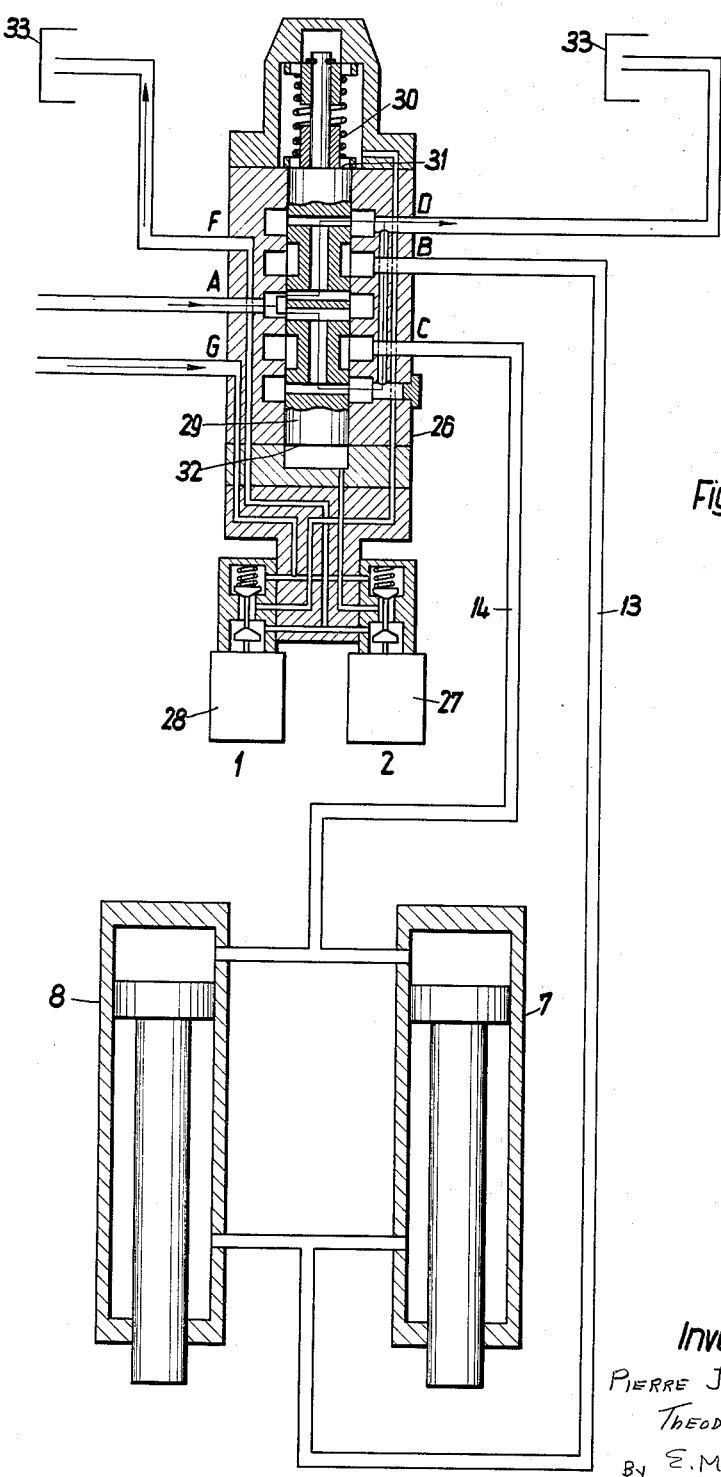
FIG. 2 is an elevational, partly sectional view of a distributor and of its electrically controlled valves inserted in by-pass relationship.

The return of the spent low pressure fluid to the supply reservoir 33 is through the port F, the main slide valve 29 being held in a central neutral position as illustrated in FIG. 2 by a set of springs 30. The slide valve 29 can be displaced only by the action of the low pressure fluid acting selectively on the upper surface 31 of the slide valve or on its lower surface 32, the springs 30 returning said slide valve into its neutral position as soon as it is no longer acted upon by the low pressure fluid. In the neutral position of slide valve 29, the pipes 13 and 14 are shut off. This locks the mechanically interconnected jacks 7 and 8. The slide valve directs the high pressure fluid through the ports B or C to the desired operative surface of the jacks 7 and 8, the port D allowing the return of the fluid stored in the circuit and release of its pressure into the reservoir 33.

When the electrically controlled valves are not energized, the slide valve 29 is in the neutral position illustrated in FIG. 2 and the corresponding jacks are inoperative. If the electrically controlled valve 27 is energized (FIG. 3), the low pressure fluid passing through the electrically controlled open valve 27 exerts a pressure on the surface 32 of the slide valve 29 and the latter is shifted upwardly in antagonism with the spring 30; at the same time, the slide valve allows the fluid under high pressure to enter through the port A, so as to feed it through the output port C onto the larger surfaces of the pistons in the jacks 7 and 8 through the agency of the pipes 14, which pistons in the jacks 7 and 8 are shifted and consequently also the skip. The ouptut is performed through BD.

When the electrically controlled valve 27 is no longer energized, it returns into the neutral position illustrated in FIG. 2 and the high pressure is again in its by-pass position, the pistons of the jacks 7 and 8 stop consequently in the position occupied by them at the moment at which the electrically controlled valve is deenergized.

When the skip is to be opened (FIG. 4), the electrically controlled valve 28 is energized so that the fluid under low pressure entering the port G may impinge against the opposite surface 31 of the slide valve 29; the spring 30 is again compressed through its upper end instead of its lower end so that it has a tendency to urge back the slide valve into its medial position. The shifting of the slide valve 29 allows the passage of the high pressure fluid from the port A towards the port B, so that said fluid acts through the agency of the pipe 13 on the smaller surfaces of the pistons in the jacks 7 and 8 and produces thus their shifting into the skip-opening position while the output at the opposite ends of the jacks is obtained through CD. In this case again, when the electrically controlled valve 28 is no longer energized, the slide valve returns into its neutral position and the fluid under pressure returns through the distributor into the container 33.

The feeding of the jack 9 is performed through the agency of a similar electrically controlled valve and the subjection to pressure of the jack 9 through either of its surfaces produces a rotation of the skip with reference to the swing bar 10 from which it is suspended, the jack being connected with the skip through securing means 34.

Figure 5:
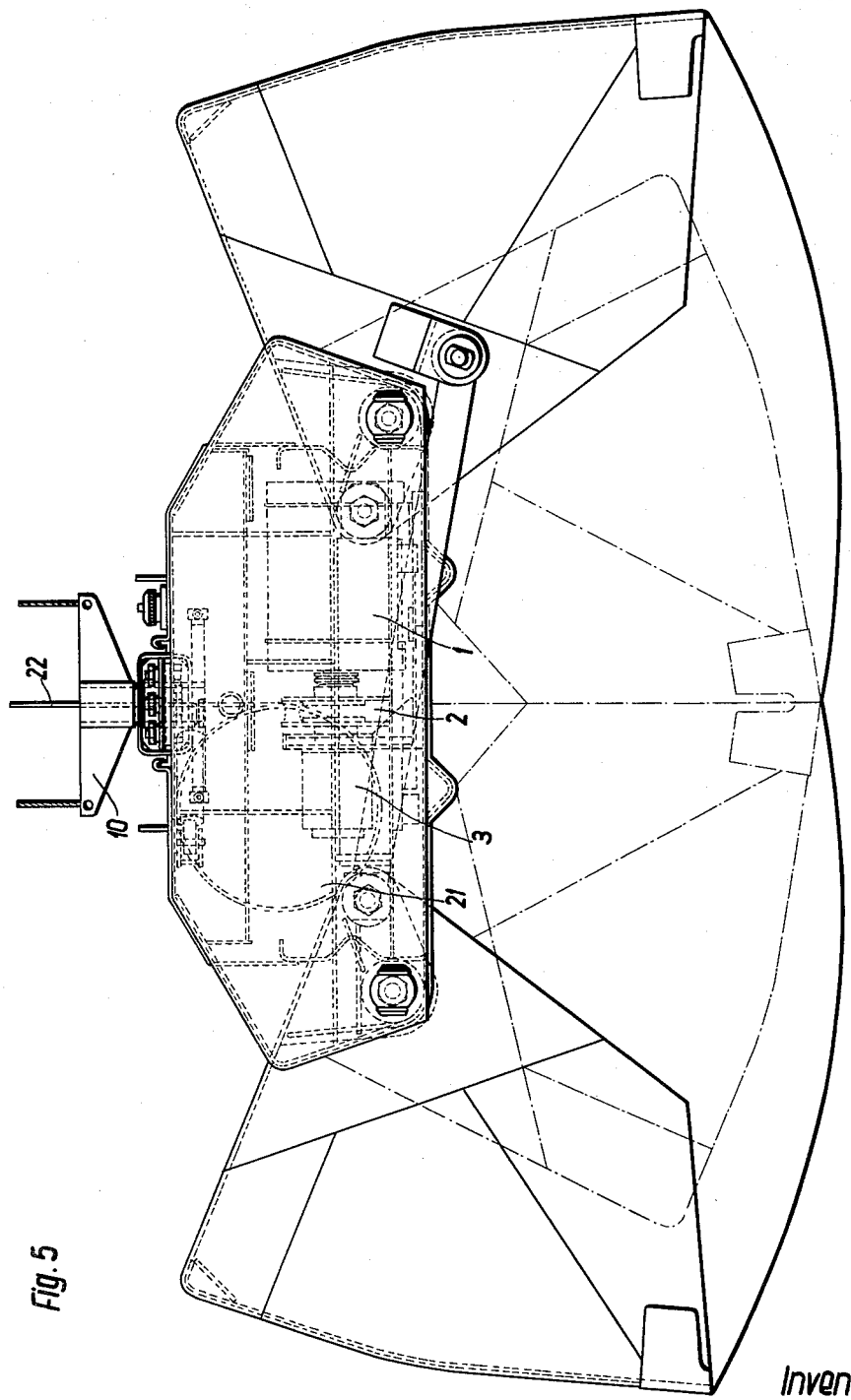
FIGS. 5 and 6 are elevational and plan views respectively of the complete hydroelectrically controlled skip equipped with an arrangement according to my invention.
Figure 6:
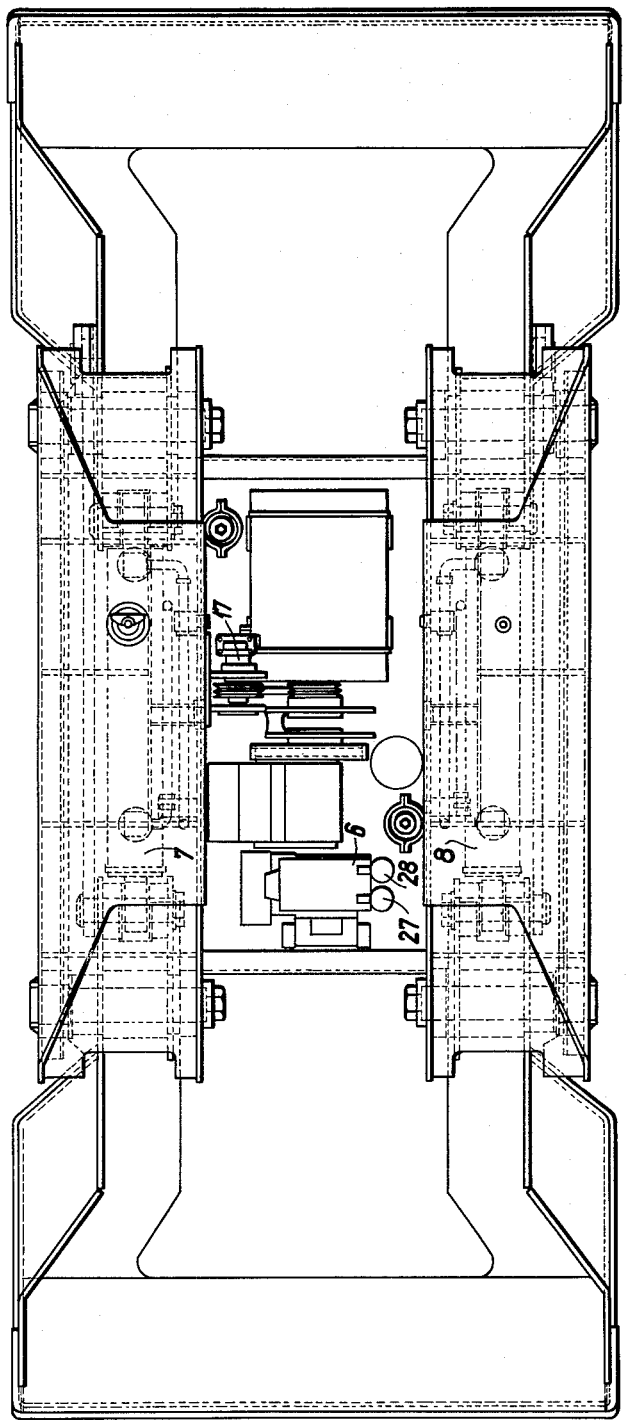

FIGS. 5 and 6 illustrate a hydroelectric skip associated with the system described hereinabove and illustrated in FIGS. 1 to 4. In said figures are drawn again the motor 1, the coupling means 2, the high pressure pump 3, the lower pressure pump 17, the distributor 6 with its electrically controlled valves 27 and 28, the jacks 7 and 8, the skip opening and closing jack 9, the swing bar 10, the electrical cable take-up drum 21 and lastly the hoisting cable 22.

Figure 7:
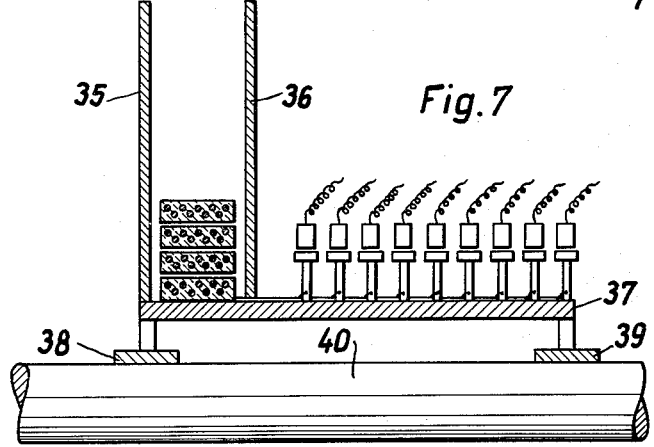
FIG. 7 is a fragmentary sectional view of the take-up drum for the contact cable.

As shown in FIG. 7, the use of a continuously operating motor requiring for a heavy gauge three-phase feed only three leads associated with a number of light gauge pilot wires feeding the electrically controlled valves, permits the use of a flexible electrical cable having a rectangular cross-section. Such an arrangement is particularly desirable since it permits the provision of a take-up drum having two very light flanges 35 and 36 fitted on a hollow core 37 mounted on bearing rings 38 and 39 freely revoluble on the shaft 40 in contact therewith.

The complete drum is connected through any suitable means with the hydraulic motor 19 which is fed by the pump 17. Commutators of a conventional type, the number of which corresponds with that of the feed wires in the yielding cable and the cross-section of which corresponds with the current intensity to be transmitted, are carried by the core 37 and are connected with the corresponding wires carried by the yielding cable. Carbon brushes of a conventional type allow connecting said commutators with the corresponding parts to be controlled. The use of a yielding cable having a flat cross-section allows obtaining a small bulk drum over which the cable is wound spirally.

Obviously, many modifications may be brought to the embodiment described and illustrated without unduly widening thereby the scope of the invention as defined in the accompanying claims.

I claim:

1. Hoisting apparatus comprising: a hoisting member, said hoisting member comprising a plurality of relatively movable parts; at least one hydraulic jack connected to said parts for producing said relative movement thereof, said jack having two connections for selectively causing relative movement of said parts in one direction or the opposite direction; a high pressure pump; a low pressure pump; drive means continuously operating both of said pumps; a high pressure hydraulic valve having a neutral position; means continuously urging said high pressure valve to its neutral position; a first hydraulic circuit extending to both of said jack connections through said high pressure valve, both of said connections being shut off with said valve in its neutral position, whereby said jack is locked, displacement of said high pressure valve from its neutral position connecting said high pressure pump to a particular one of said jack connections; a second hydraulic circuit including two branches each connecting said low pressure pump to said high pressure valve for selectively displacing said valve in a predetermined direction from its neutral position; a low pressure valve in each of said branches; means for selectively operating either of said low pressure valves for operating said jack in a predetermined direction; reservoir means connected to receive spent pressure fluid pumped by said pumps, said pumps being connected to pump pressure fluid from said reservoir means through said hydraulic circuits to said valves and said jack; and a hoisting cable connected to support said hoisting member, said jack, said pumps, said drive means, said hydraulic circuits, said valves and said reservoir means.

2. Hoisting apparatus according to claim 1, wherein said drive means is a substantially constant speed electric motor common to both of said pumps, and in which both of said low pressure valves are electrically operated, said apparatus further comprising: a flexible electrical cable including a plurality of separate mutually insulated conductors, at least two of said conductors being heavy gauge conductors connected to energize said motor and at least two others of said conductors being relatively light gauge conductors connected to operate said low pressure valves selectively; a take-up drum for said electrical cable, said drum being supported by said hoisting cable along with said hoisting member; a hydraulic motor connected to drive said take-up drum to reel in said cable, said motor being continuously connected to said low pressure pump; and pressure regulating means connected to said low pressure pump, whereby said electrical cable is maintained under continuous tension and may be paid by pulling on said cable to unwind it from said take-up drum.

3. Hoisting apparatus according to claim 2, wherein said electrical cable is of elongated rectangular cross-sectional configuration, said take-up drum having axially spaced end flanges for receiving and guiding the shorter sides of said flexible cable therebetween.

References Cited by the Examiner

UNITED STATES PATENTS

| | | | |
|---|---|---|---|
| 740,166 | 9/1903 | McLauthlin | 254—186 |
| 989,534 | 4/1911 | Macduffee | 254—186 |
| 1,943,061 | 1/1934 | Douglas | 60—52 |
| 2,258,307 | 10/1941 | Vickers | 254—186 |
| 2,615,302 | 10/1952 | Camerota. | |
| 3,010,479 | 11/1961 | Foley | 137—596.16 X |
| 3,129,645 | 4/1964 | Olmsted | 91—461 |

GERALD M. FORLENZA, *Primary Examiner.*

SAMUEL F. COLEMAN, HUGO O. SCHULZ,
*Examiners.*